US006994271B2

(12) United States Patent
Tarara et al.

(10) Patent No.: US 6,994,271 B2
(45) Date of Patent: Feb. 7, 2006

(54) AUTOMATED CHEMICAL APPLICATION SYSTEM AND METHOD

(75) Inventors: Jim Tarara, Eagan, MN (US); Robert D. P. Hei, Baldwin, WI (US); Keith Lokkesmoe, Savage, MN (US); Terry Klos, Victoria, MN (US); Mike Besse, Golden Valley, MN (US)

(73) Assignee: Ecolab, Inc., St. Paul, MN (US)

( * ) Notice: Subject to any disclaimer, the term of this patent is extended or adjusted under 35 U.S.C. 154(b) by 185 days.

(21) Appl. No.: 10/667,292

(22) Filed: Sep. 22, 2003

(65) Prior Publication Data

US 2005/0061752 A1 Mar. 24, 2005

(51) Int. Cl.
*A01G 27/00* (2006.01)
*A62C 31/00* (2006.01)
*B05B 7/10* (2006.01)

(52) U.S. Cl. .......................... 239/67; 239/68; 239/69; 239/70; 239/398; 239/406

(58) Field of Classification Search ................ 239/67, 239/68, 69, 70, 71, 398, 406, 413, 418, 419, 239/421, 433
See application file for complete search history.

(56) References Cited

U.S. PATENT DOCUMENTS

| | | | |
|---|---|---|---|
| 4,268,993 A | | 5/1981 | Cunningham |
| 4,341,350 A | * | 7/1982 | Wemmer ................ 239/312 |
| 4,462,184 A | | 7/1984 | Cunningham |
| 4,545,396 A | | 10/1985 | Miller et al. |
| 4,690,305 A | | 9/1987 | Copeland |
| 4,826,661 A | | 5/1989 | Copeland et al. |
| 5,740,031 A | | 4/1998 | Gagnon |
| 5,851,260 A | | 12/1998 | Äijälä et al. |
| 5,863,861 A | | 1/1999 | Einziger |
| 5,873,268 A | | 2/1999 | Spriggs et al. |
| 6,206,046 B1 | | 3/2001 | Finley |
| 6,287,357 B1 | | 9/2001 | Lynch et al. |
| 6,358,538 B1 | | 3/2002 | Provitola |
| 6,393,927 B1 | | 5/2002 | Biggs et al. |
| 6,576,035 B2 | | 6/2003 | Hartmann et al. |
| 2002/0121117 A1 | | 9/2002 | Hartmann et al. |
| 2002/0186614 A1 | | 12/2002 | Millward |

FOREIGN PATENT DOCUMENTS

| | | |
|---|---|---|
| EP | 0018234 A1 | 4/1980 |
| EP | 0 949 221 A1 | 4/1999 |
| WO | WO 95/28369 | 4/1995 |
| WO | WO 97/08942 | 9/1996 |
| WO | WO 98/21167 | 11/1997 |
| WO | WO 99/39567 | 2/1999 |
| WO | WO 00/71486 A1 | 11/2000 |
| WO | WO 01/42170 A1 | 12/2000 |
| WO | WO 03/053883 A1 | 7/2002 |

* cited by examiner

*Primary Examiner*—Davis Hwu
(74) *Attorney, Agent, or Firm*—Merchant & Gould PC

(57) ABSTRACT

An automated chemical application system for automating the application of a chemical to a target. In a first embodiment, an automated chemical application system connects to and interacts with an individual's existing sprinkler system. The automated chemical application system may thereby deliver concentrations of agricultural chemicals to different zones of the lawn via the sprinkler system. In a second exemplary embodiment, an automated chemical application system automatically mixes a chemical with water to dispense a precise amount of the chemical to a target.

21 Claims, 13 Drawing Sheets

AUTOMATED CHEMICAL APPLICATION SYSTEM AND METHOD

FIELD OF INVENTION

This invention relates generally to the field of chemical dispensing systems. More specifically, this invention relates to an automated chemical dispensing system integrated with a delivery system.

BACKGROUND OF THE INVENTION

Technology has led to the automation of many of the labor-intensive tasks in today's world, increasing the quality of life and making life easier. In the lawn care field, the fertilization of grass still involves the manual intervention of an individual who must either spread a powdered mixture or spray fertilizer, herbicide, and pesticide on the lawn. Automated, in-ground sprinkler systems efficiently distribute water to a lawn, but do not currently address the distribution of chemicals as noted above. Chemical lawn spraying systems, such as those used by commercial lawn care professionals, are designed to distribute chemicals to a lawn, but these systems are typically used only by professionals with the added cost and time required for application.

The handling and application of these chemicals also presents a health risk to the individual. Further, commercial chemical distribution requires the transportation and use of large, bulky containers of liquid chemicals. It is also difficult to consistently apply the correct amount of a given chemical at the correct time and further vary application to account for differences in the needs of different areas of a lawn.

SUMMARY OF THE INVENTION

The problems described above as well as other problems are solved by a system and method in which the mixture and application of chemicals has been automated to reduce the amount of manual intervention, increase safety in the application, reduce the size and bulk of the equipment necessary to apply the fertilizer, and improve the consistency of application.

In one exemplary embodiment of the present invention, an automated chemical application system connects to and interacts with an individual's existing sprinkler system. This automated chemical application system may thereby deliver fertilizers, herbicides, and pesticides to different zones of the lawn via the sprinkler system.

In a second exemplary embodiment in accordance with the invention, an automated chemical application system utilizes powdered or solid fertilizers, herbicides, pesticides, and/or components thereof and automatically mixes these chemicals with water to dispense a precise concentration of chemicals. This automated chemical application system thereby allows tailored distribution of multiple chemicals and eliminates the necessity for large and bulky containers of premixed liquid fertilizer, thereby decreasing expenses in transportation and use.

Other embodiments are also possible, such as the delivery of disinfectants (e.g., food processing lines) and the delivery of chlorine (e.g., swimming pools).

In this manner, the invention automates the delivery of chemicals, increases safety, and reduces the size of the components necessary for the transportation and use of these chemicals.

These and various other features as well as other advantages of the present invention will be apparent from a reading of the following detailed description and a review of the associated drawings.

DETAILED DESCRIPTION OF THE PREFERRED EMBODIMENT

Figure 1:
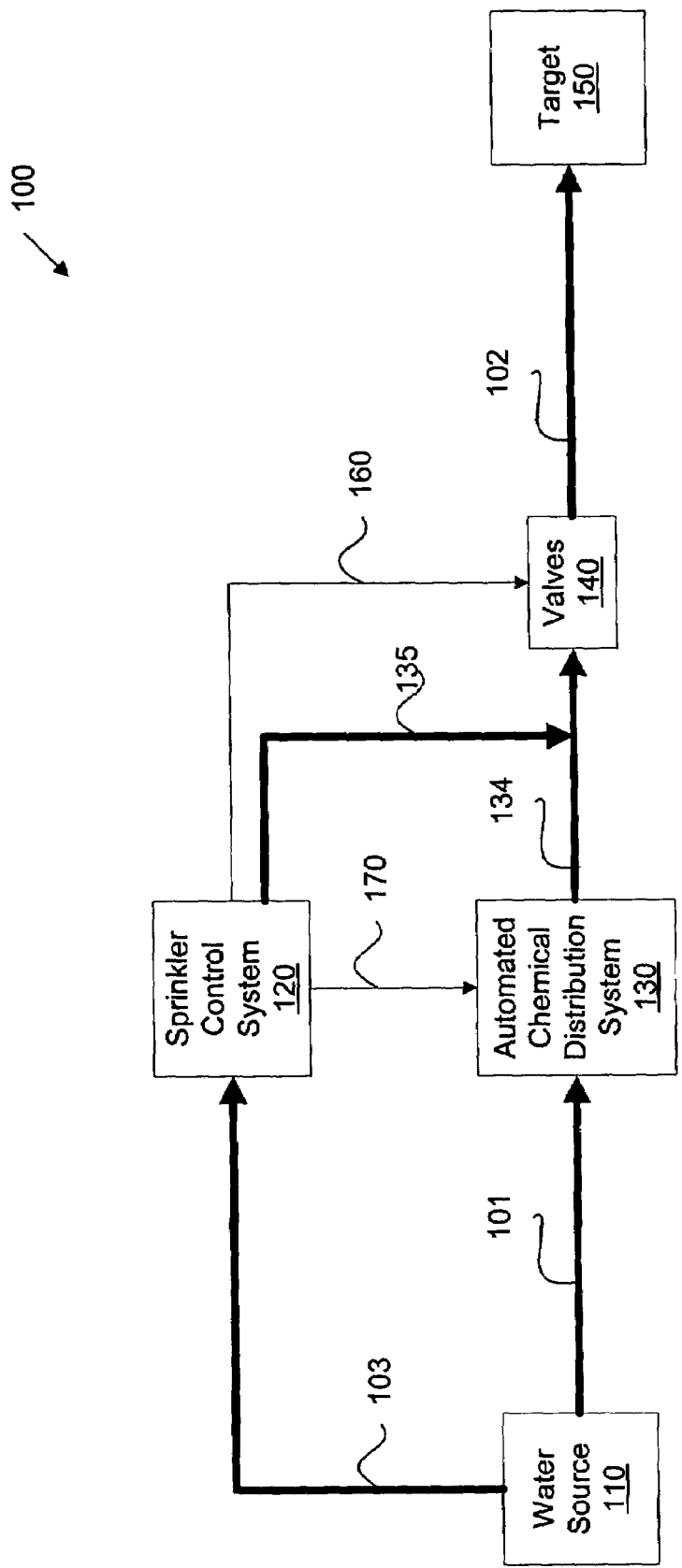
FIG. 1 shows an exemplary automated chemical application system utilized in conjunction with a sprinkler control system in accordance with an embodiment of the present invention.

A first example embodiment of the invention, utilized generally in an environment 100 as shown in FIG. 1, includes an automated chemical application system 130, as well as a water source 110, a sprinkler control system 120, valves 140, and a target 150. The water source 110 is coupled to both the automated chemical application system 130 as well as the sprinkler control system 120 via conduits 101 and 103, respectively. The sprinkler control system 120 is coupled via a conduit 135 to the valves 140 and is further linked to the valves 140 via a control link 160. The output of the automated chemical application system 130 is coupled to the valves 140 via a conduit 134. The valves 140 are coupled to the target 150 via a conduit 102. The sprinkler control system 120 controls the valves 140 via the control link 160 to regulate the water (and associated chemicals contained therein) provided to the target 150.

In this exemplary embodiment, the target 150 is a lawn. The target 150 is divided into a plurality of zones. A zone is an area containing similar environmental conditions, so that a given quantity and combination of chemicals is preferably applied equally across the zone for maximum benefit. Different zones within the target 150 may be of different sizes and may require different applications of chemicals.

For example, a target consisting of 5000 square feet of lawn may be divided into 3 zones consisting of a first zone of 2500 square feet and second and third zones of 1250 square feet each. The first zone may be on the north side of the property, requiring additional chemicals for feeding and pest control. Alternatively, zones 2 and 3, located on the east and west sides, may require fewer chemicals for feeding and pest control. In this manner, the distribution of chemicals to each zone may be tailored to maximize the benefit to each zone.

Although the target and associated zones are described as a lawn in this embodiment, a target may take a variety of forms. For example, other targets may include other vegetation (e.g. gardens), roads (e.g. distribution of deicing chemicals), and swimming pools (e.g. distribution of chlorine).

Referring once again to FIG. 1, the sprinkler control system 120 is further coupled to the automated chemical application system 130 via one or more links 170 such that the automated chemical application system 130 can monitor the operation of the sprinkler control system 120.

The sprinkler control system 120 may generally be described as a typical lawn sprinkler control system constructed to deliver water from the water source 110 via conduits 103, 135, and 102 to a plurality of zones located throughout the target 150. The sprinkler control system 120 may be pre-installed or may be installed contemporaneously with the automated chemical application system 130. In this manner, the automated chemical application system 130 works in conjunction with the sprinkler control system 120 to distribute chemicals to one or more of the zones comprising the target 150. It should be understood that the automated chemical application system 130 is designed to work in conjunction with a variety of different sprinkler control systems.

The sprinkler control system 120 provides water to the target 150 when needed, on an automatic or manual basis. The sprinkler control system 120 may typically be controlled by a timer (not shown), and the sprinkler control system 120 may further control individual zones or groups of zones separately via the actuation of the valves 140 to control the date, time of day, duration, and thus amount of water (and chemicals contained therein) provided to each of the plurality of zones comprising the target 150 over a period of time.

The automated chemical application system 130, according to this example embodiment, also receives water from the water source 110 via the conduit 101. The chemical distribution system 130 comprises the components necessary to mix or dissolve one or more chemicals with the water provided. In this embodiment, the chemical is described as "a" chemical. However, it should be understood that a mixture of chemicals may also be used, as well as several separate chemicals or chemical components that are mixed together, as illustrated in another exemplary embodiment shown in FIGS. 8 and 9.

The chemical contained within the automated chemical application system 130 may take the form of a solid, a powder, a concentrated liquid, or other such concentrated form. The chemical may include, but not be limited to, a fertilizer, a pesticide, a herbicide, or other relevant chemicals such as lime or iron. These types of chemicals are referred to herein as agricultural chemicals. Other chemicals may also be used depending on the specific embodiment, such as chlorine or other such chemicals for swimming pools and salt and other such chemicals for road deicing. It should be understood that other chemicals can also be used without departing from the spirit of the invention.

The automated chemical application system 130 facilitates the mixture of the chemical with the water received via the conduit 101. Then, the water containing the dissolved or mixed chemical is introduced into the conduit 134, where it thereupon mixes with the water in the conduit 135 as the water passes into and through the valves 140 and is carried through the conduit 102 to the target 150. In this manner, the chemicals may be distributed to the one or more zones comprising the target 150.

Figure 2:
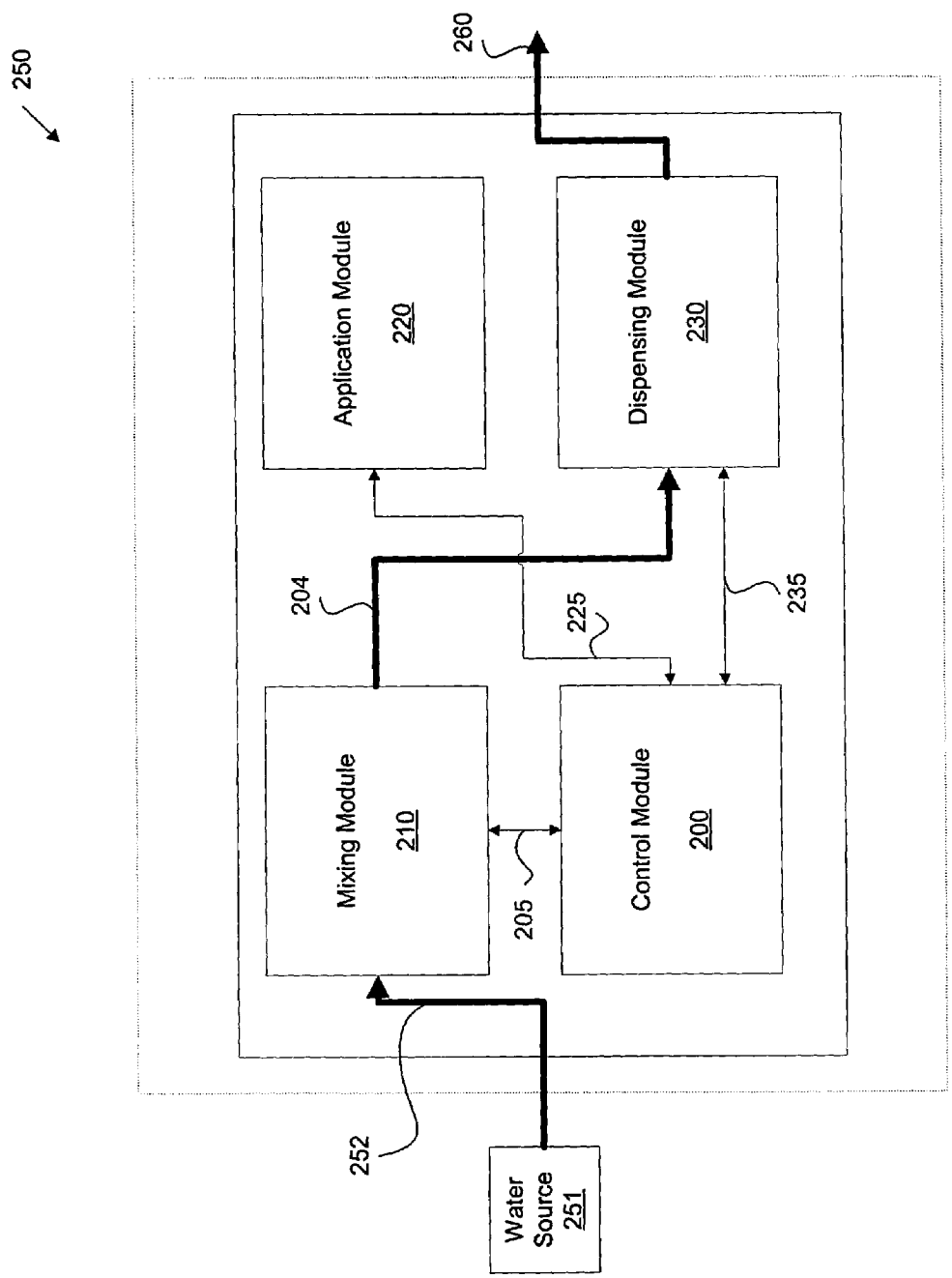
FIG. 2 shows the components comprising an exemplary automated chemical application system in accordance with an embodiment of the present invention.

Referring now to FIG. 2, the components comprising another exemplary automated chemical application system 250 according to the present invention are shown. The exemplary automated chemical application system 250 includes a control module 200, a mixing module 210, an application module 220, and a dispensing module 230. The automated chemical application system 250 includes control links 205, 225, and 235 that couple each of the modules 210, 220, and 230 to the control module 200. Further illustrated is a water source 251, as well as conduits 252, 204, and 260 that channel the flow of water through the automated chemical application system 250 and out via the conduit 260.

The control module 200 is coupled via the control links 205, 225, and 235 to the other modules, and the control module 200 functions to control user input and output, provide date and time information, provide data storage, provide a mode control, and manage input and output for a plurality of add-on modules.

The control module 200 calculates a precise amount of the chemical to be mixed or dissolved by the mixing module 210, as well as controls the dissolution of the chemical into the water to create a sump mixture. A sump mixture is herein defined as the mixture of chemical and water contained within the mixing module 210. The sump mixture may form a solution. The mixing module 210 may also include automatic or manual calibration controls to further control and refine the amount of the chemical in the sump mixture.

The application module 220 controls a plurality of zone parameters associated with a plurality of zones and includes an application totalizer to monitor the total amount of the chemical applied for a given period. The components of the application module 220 tailor the amount of the sump mixture that is delivered from the mixing module 210 to the dispensing module 230 via conduit 204. This amount of sump mixture is provided to the dispensing module 230 and is referred to herein as the mixture application amount. The mixture application amount is the amount of the sump mixture that is actually delivered to the dispensing module for distribution into conduit 260 and thereupon delivery to the target.

The dispensing module 230 controls the duration, timing, and rate of the delivery of the mixture application amount to the target via the conduit 260.

Figure 3:
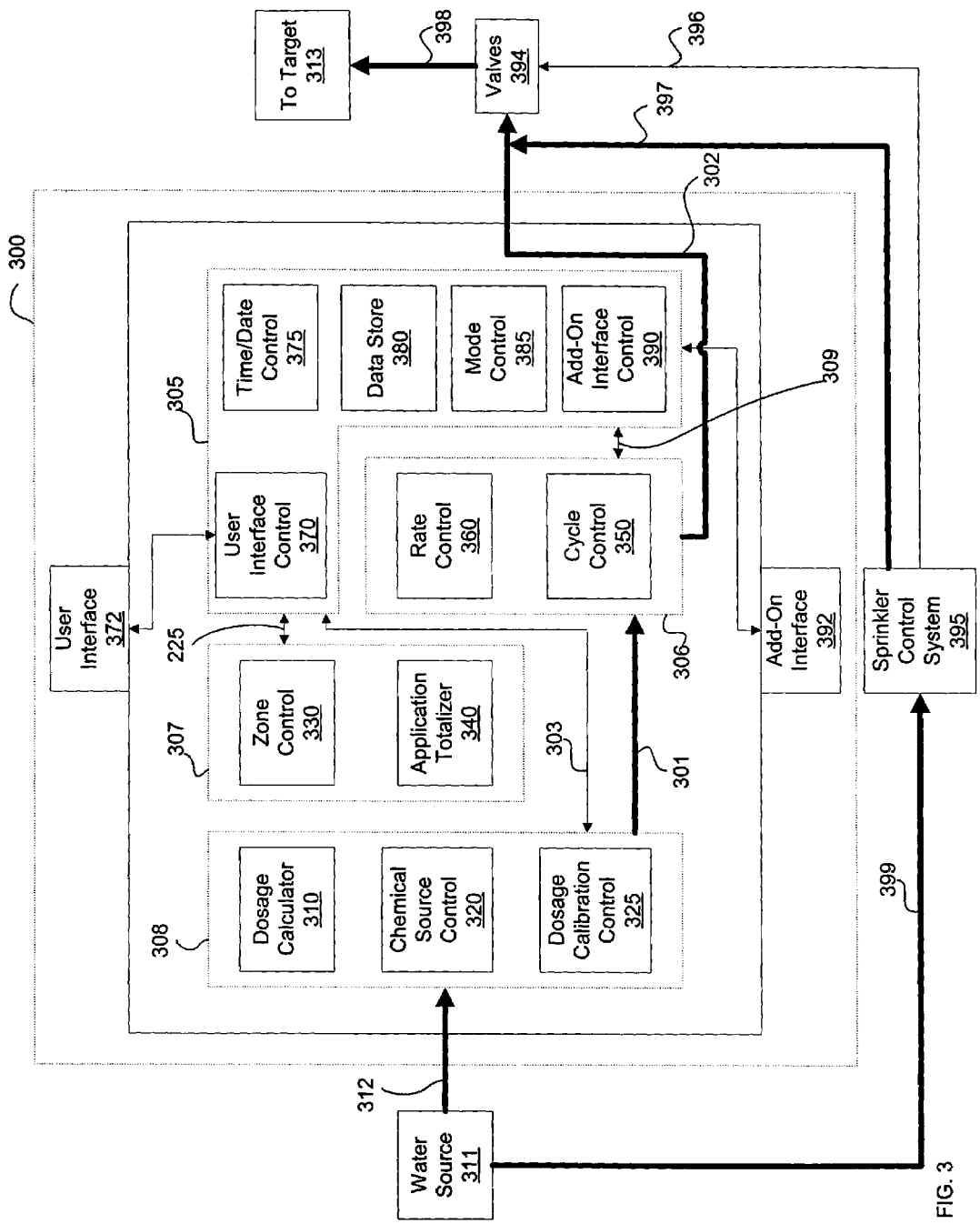
FIG. 3 illustrates in greater detail the components comprising an exemplary automated chemical application system in accordance with an embodiment of the present invention.

Another exemplary automated chemical application system 300 according to the present invention is illustrated in FIG. 3. The automated chemical application system 300 comprises a control module 305, a mixing module 308, an application module 307, and a dispensing module 306. Further included are links 303, 304, and 309 interconnecting the modules and conduits 312, 301, 302, and 398 interconnecting the modules to a water source 311 and a target 313 via valves 394.

Also included is a sprinkler control system 395 coupled to the water source 311 via a conduit 399. An output of the sprinkler control system 395, a conduit 397, is coupled to the valves 394 via the conduit 302. The sprinkler control system 395 is coupled to the valves 395 via a link 346.

The control module 305 comprises a user interface control 370, a time/date control 375, a data store 380, a mode control 385, and an add-on interface control 390. The mixing module 308 includes a dosage calculator 310, a chemical source control 320, and a dosage calibration control 325. The application module 307 comprises a zone control 330 and an application totalizer 340. The dispensing module 306 includes a cycle control 350 and a rate control 360. Further included in the automated chemical application system 300 are a user interface 372 and an add-on interface 392.

The user interface control 370 of the control module 305 may accept input from the user interface 372 and display information to a user via user interface 372. The user interface 372 may include a keypad, keyboard, mouse or other method of input as well

TABLE 1

Data Store Parameters

| Parameter | Zone 1 | Zone 2 | Zone N |
|---|---|---|---|
| Size | 1500 | 680 | ft² |
| Nutrient Requirements | 705 | 320 | grams |
| Pesticide Requirements | 84 | 38 | grams |
| Herbicide Requirements | 210 | 95 | grams |
| Soil Condition | Clay | Sand/Clay | Soil Type |
| Soil pH Level | 6.5 | 6.2 | pH |
| Moisture Level | 1.4 | 1.8 | Inches/Foot |
| Total Previous Application Amount (totalized 30 day avg.) | | | |
| Nutrient | 250 | 115 | grams |
| Pesticide | 39 | 21 | grams |
| Herbicide | 150 | 35 | grams |
| Desired Application Amount | | | |
| Nutrient | 455 | 205 | grams |
| Pesticide | 45 | 17 | grams |
| Herbicide | 60 | 60 | grams |
| Desired Number of Applications | 2 | 2 | |
| Run Time | | | |
| Nutrient | 9.1 | 4.1 | minutes |
| Pesticide | 0.9 | 0.3 | minutes |
| Herbicide | 1.2 | 1.2 | minutes |
| Dosage Factor | 0.03 | 0.4 | |
| Dosage Cycle Duration | 15 | 8 | minutes |
| Dosage Cycle Placement (Delay Time) | 0.18 | 1.56 | minutes |

The mode control 385 controls the mode in which the distribution system is running. Typically the modes may include automatic or manual, but hybrid modes are also possible. Generally, in automatic mode, the distribution system automatically distributes sump mixture into the sprinkler control system at automated intervals and automatically generates certain functional parameters, such as sump mixture concentration described below. In manual mode, the distribution may be manually inputted to customize the distribution system.

The add-on interface control 390 of the control module 305 accepts input from the add-on interface 392. The add-on interface 392 communicates with a plurality of as a screen, series of lights, speaker or other such method of output. In this manner, the user interface 372 allows for input from the user and provides output to the user.

In the illustrated embodiment, the time/date control 375 provides current time and date and measures durations of time. The data store 380 may comprise any type of conventional memory such as, for example, volatile and/or nonvolatile memory, to store and allow access to a plurality of parameters associated with the operation of the automated chemical application system 300. A Table 1 below provides exemplary parameters that may be stored in data store 380. Many of these parameters are further defined in the description below. The parameters provided in Table 1 are by way of example only, and other parameters are also possible. Furthermore, not all of the parameters are required to implement an embodiment of the present invention. add-on components that can be used with the automated chemical application system 300. For example, one such add-on component includes a moisture sensor positioned within the target 313 to provide feedback to the automated chemical application system 300 as to the water content of the target 313. In this manner, the mixture application amount can be tailored to maximize the benefits to the target 313.

A variety of add-on components may be used with the automated chemical application system 300. Other sensors that may be utilized as add-on components include rain gauges to measure rainfall, temperature gauges to measure the temperature, humidity gauges to measure humidity, and pH gauges to measure the composition of the soil. Other add-on components may include such devices as a global positioning device, described further below. While examples of different possible add-on components have been listed, one skilled in the art will understand that other add-on components may also be utilized to maximize the information provided to the automated chemical application system and thereby maximize the benefits to the target 313.

In addition, additional components can be added to the mixture application amount based on input from the various components of the system 300. For example, based on input from a pH gauge, alkaline product can be added to the mixture application amount if the pH of a particular zone is less than six, and likewise, acidifier product can be added if the pH is greater than seven.

In an embodiment, water from the water source 311 enters the automated chemical application system 300 via the conduit 312 and flows into the mixing module 308. The mixing module 308 generally functions to combine the water with the chemical in a given ratio to create the sump mixture having the appropriate chemical amount or concentration. The dosage calculator 310 calculates an amount of the chemical to be added to the water. In this example embodiment, a user may input a chemical concentration. The chemical concentration is herein defined as the desired concentration of chemical in the sump mixture. Alternatively, the automated chemical application system 300 may be set to automatically assume a desired chemical concentration if only one type of chemical will be used.

In this example embodiment, the chemical concentration of the sump mixture ranges from 3–15 percent. However, other chemical concentrations may also be used to create the sump mixture, depending on the chemicals used and on the needs of the target 313.

Once a chemical concentration has been calculated, the chemical source control 320 prepares the sump mixture by mixing the water with the chemical. The chemical source control 320 may function in a manner similar to that of the chemical dispenser disclosed in U.S. Pat. No. 4,690,305 to Copeland, incorporated by reference herein in its entirety. Other similar systems include those disclosed in U.S. Pat. Nos. 4,826,661 and 5,873,268, all of which are incorporated by reference herein in their entireties.

Figure 12:
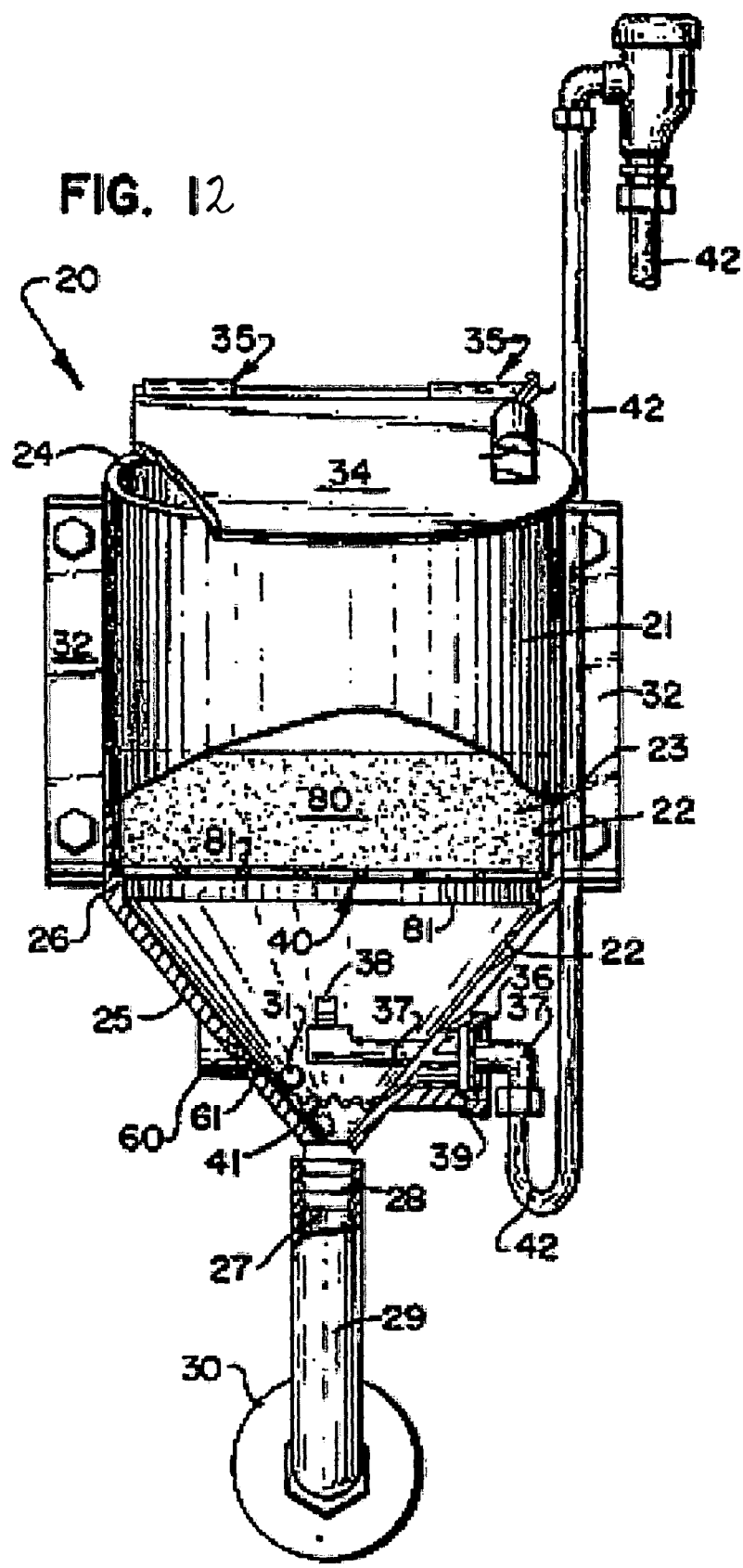
FIG. 12 depicts an exemplary chemical source control in accordance with an embodiment of the present invention.

Although Copeland discloses a chemical dispenser system for cleaning solutions, the system is equally applicable for the present invention. An embodiment of a chemical source control, similar to the chemical dispenser disclosed in Copeland, is illustrated in FIG. 12. A full description of the chemical source control as shown in FIG. 12 is provided below.

It should be understood that other dispensing systems besides that shown in FIG. 12 may also be used. For example, if the chemical is in concentrated liquid form, the chemical source control 320 may comprise a syringe with associated pumping mechanism. The concentrated liquid chemical can be dispensed directly into the water by actuating the plunger at a desired time for a desired duration.

In an embodiment of the present invention, the mixing module 308 includes the calibration control 325, which monitors the actual concentration of the sump mixture. The calibration control 325 may be automatic or manual (i.e. requiring user intervention). The calibration process may be performed in a variety of ways. In this example embodiment, an automatic method of calibration uses an in-line device that measures a refractive index. In another embodiment, a manual method using a colorimetric color wheel is utilized. Other methods, such as conductivity analysis or use of a tracer material that can be measured using a pH indicator can also be used for calibration purposes.

If it is determined that the sump mixture concentration is outside a certain desired chemical concentration range, the calibration control 325 adjusts the chemical concentration of the sump mixture. If an automatic calibration method is used, it can be set to perform calibration analysis at predetermined intervals. If a manual method is used, calibration is preferably performed once per year, or after the temperature or pressure of the water source 311 changes.

The application module 307 calculates the mixture application amount, or the amount of the sump mixture that will be delivered to the target 313. A component of the application module, the zone control 330, maintains a plurality of zone parameters associated with the one or more zones that comprise the target 313.

For example, each zone may include information related to the size of the zone, nutrient requirements, pesticide and herbicide requirements, soil conditions, moisture levels, etc. Other zone parameters are also possible. The user may enter the zone parameters manually via user interface 372, or the zone parameters may be automatically set to nominal values. The plurality of zone parameters is stored in data store 380. When the sprinkler control system 395 activates watering for a specific zone, the zone control 330 may access the zone parameters associated with the specific zone and tailor the amount and type of sump mixture that is delivered to the zone. The exemplary Table 1 above includes many of the zone parameters that may be maintained by the zone control 330. Additional zone parameters may also be used, and not all zone parameters shown in Table 1 are necessary for the operation of the illustrated embodiment.

Further included in application module 307 is application totalizer 340. Application totalizer 340 calculates a running total of the application of a chemical for a given period of time, as measured by time/date control 375. In this given period of time, and possibly separately for each zone, application module 307 records the following zone parameters: total previous application amount, desired application amount, desired number of applications, and total previous number of applications performed. The total previous application amount is a running total of the amount of chemical applied to the target for the given period. The desired application amount is the total amount of chemical that is desired to be applied in the given period. The desired number of applications is the desired number of times that the chemicals should be applied in a specific period. The desired number of applications can be provided on a graduated scale such as, for example, 1–2 applications being aggressive, 3–5 applications being moderate, and 6–9 applications being slow. Further, the desired number of applications can be adjusted automatically if the desired application amount falls above or below a given threshold (e.g., if total previous application amount is less than 75% of the desired application amount, the number of desired applications is decreased, while if the total previous application amount is greater than 125 of the desired application amount, the number is increased). The desired number of applications may be entered manually or may be calculated automatically based on the period length.

The total previous number of applications performed is the total number of applications that have been done within the given period. A period is a duration of time that may be automatically set or manually specified. In an example embodiment, the period is set to 30 days. Other durations may also be used. The zone parameters are preferably reset as each period ends and a new period begins, or alternatively a running total can be stored.

The application totalizer 340 may utilize the following Equation 1 to calculate a specific mixture application amount.

$$\text{mixture app. amt.} = \frac{\text{desired app. amt.} - \text{total previous app. amt.}}{\text{sump conc } (\%) \times \text{desired number of apps.}} \quad [1]$$

Utilizing Equation 1, if the total previous application amount exceeds the desired application amount, the automated chemical application system 300 will not be activated, because the mixture application amount will be set to 0. If the automated chemical application system 300 is running in an automatic mode, the desired application amount and desired number of applications may be set to preset values.

The desired application amount is typically provided, either manually by the user or automatically set, as the amount of the chemical (in grams) to be applied to each of the one or more zones. Depending on how the automated chemical application system 300 is configured, the desired application amount may further be provided as the actual amount of sump mixture (i.e. chemical diluted with water) to be applied to each of the one or more zones.

The cycle control 350 functions to monitor a run time for the sprinkler control system 395 for each of the one or more zones. The sprinkler control system 395 selects among the one or more zones by manipulating the valves 394 via the link 396. The run time is the period of time the sprinkler control system 395 activates and pumps water to a given zone. The run time may vary from zone to zone depending on how the sprinkler control system 395 is configured. Further, the run times may not be periodic (e.g. daily or weekly) if the sprinkler system 395 includes sensors such as a moisture sensor which may postpone or remove one or more run times if sufficient moisture is already present in the soil, such as from rainfall. Therefore, the cycle control 350 functions to monitor run times for each of the one or more of zones and further records these run times into data store 380 for future access. As the run times are varied by the sprinkler control system 395, the cycle control 350 monitors and updates the recorded run times for each of the one or more zones.

The cycle control 350 may further calculate when, within a given run time, to deliver the mixture application amount. The interval within the run time during which the mixture application amount is to be delivered is termed the dosage cycle. The dosage cycle may include a dosage cycle duration and a dosage cycle placement. The dosage cycle duration is the duration during which the mixture application amount is delivered. The dosage cycle placement is the location within the run time in which the dosage cycle is place.

Figure 4:
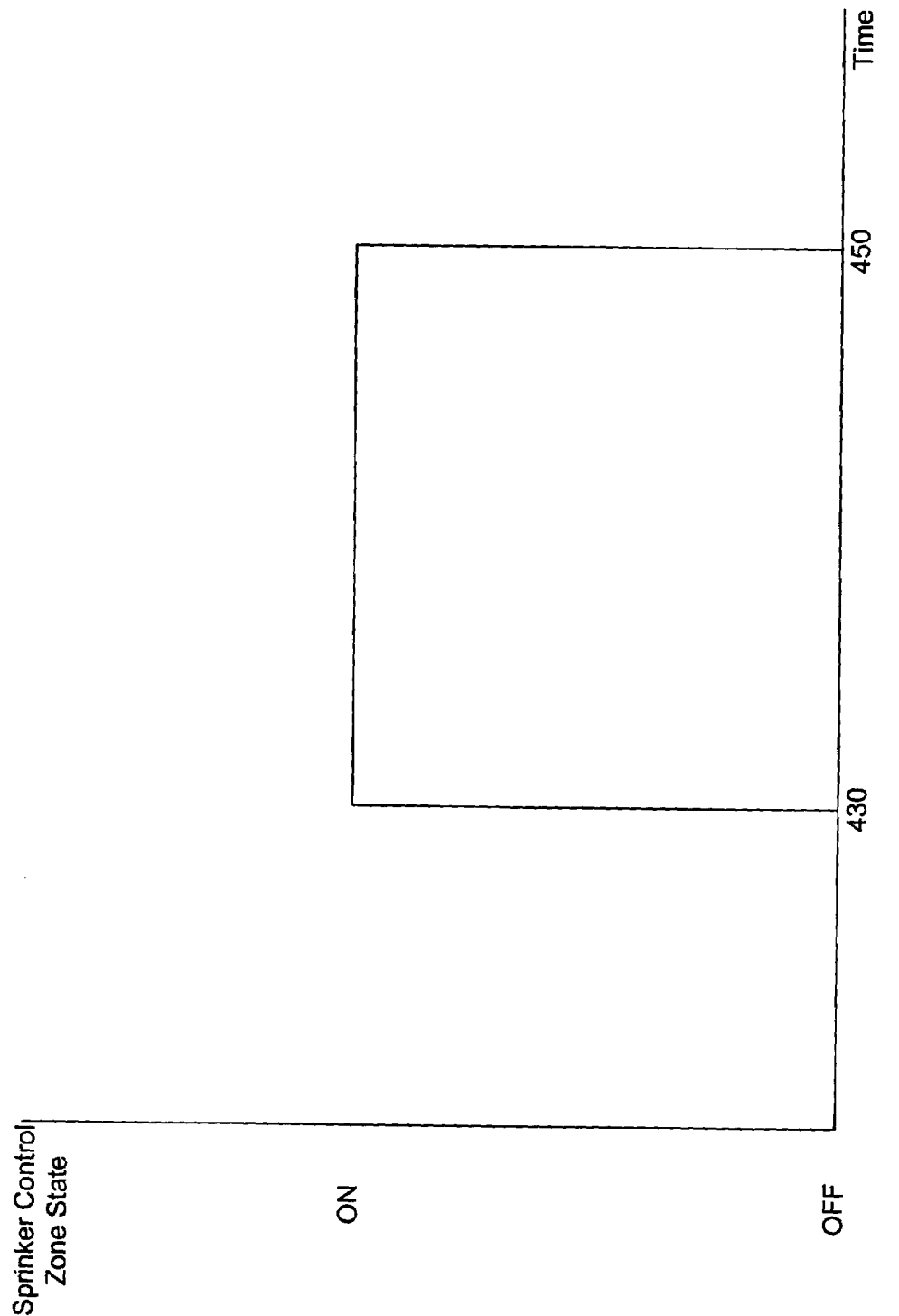
FIG. 4 is a plot diagram illustrating the state of the sprinkler control system in accordance with an embodiment of the present invention.
Figure 5:
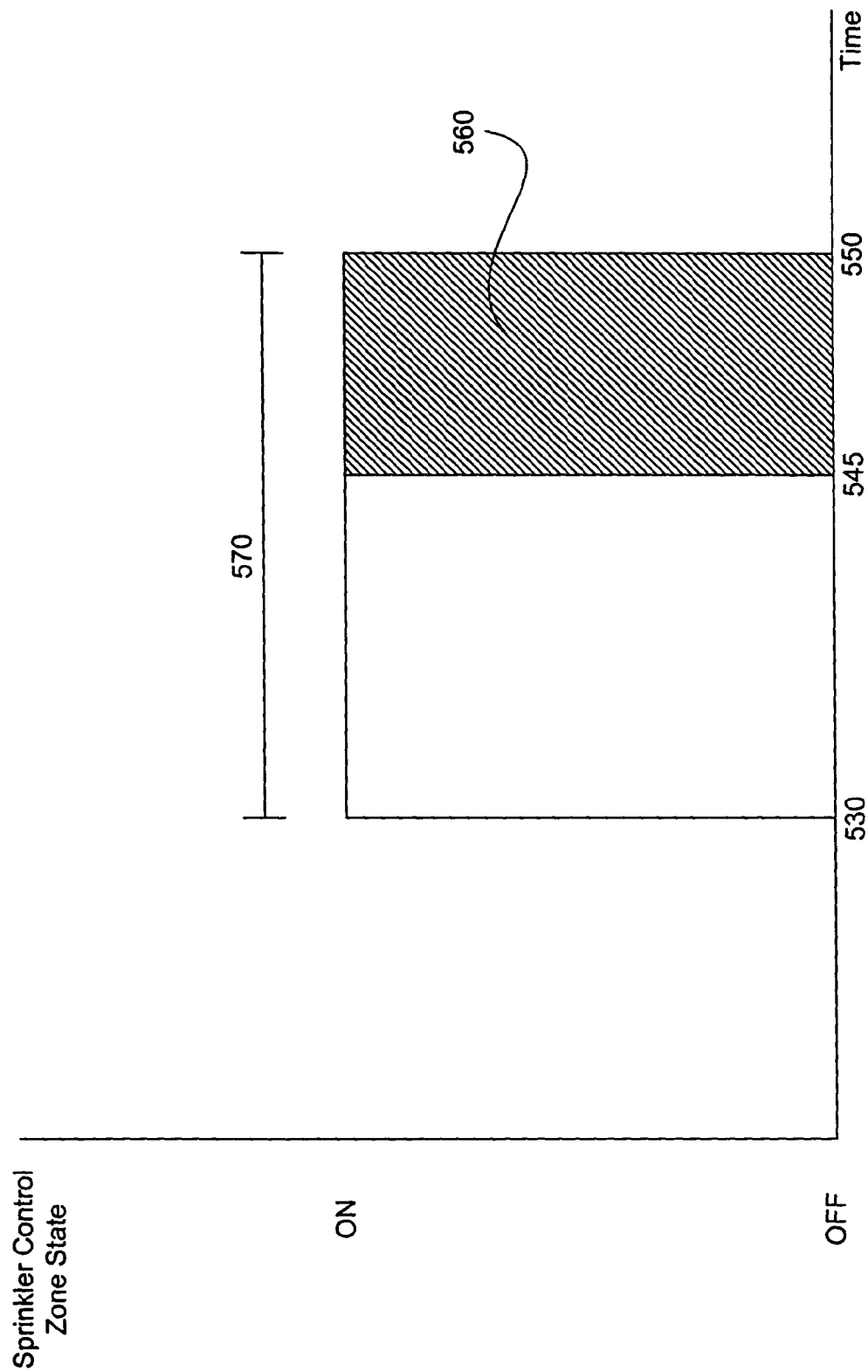
FIG. 5 is another plot diagram showing the state of the sprinkler control system in accordance with an embodiment of the present invention.

By way of example, sample run times for a given zone are illustrated in FIGS. 4 and 5. In FIG. 4, the x-axis represents time and the y-axis represents the state of a sprinkler control system for a specific zone, either "OFF" (i.e. not dispensing water to the target zone) or "ON" (i.e. currently dispensing water to the target zone). As is shown, the run time for the zone illustrated in FIG. 4 starts at 430 and ends at 450. The time that elapses between 430 and 450 represents the run time, or the time during which the sprinkler control system activates and is delivering water to the given zone.

The cycle control 350 may set the dosage cycle to deliver the mixture application amount during the entire run time, or the dosage cycle placement may be set to deliver the mixture application amount during a specified portion of the run time. In FIG. 5, the dosage control cycle 350 has been programmed to set the dosage cycle placement in the later half of the run time for the sprinkler control system. The run time for the specific zone illustrated in FIG. 5 is the duration between 530 and 550. The dosage cycle duration during which the control cycle 350 allows for dispensing of the mixture application amount is shown as the duration between 545 and 550 (the hatched region 560). As is shown in FIG. 5, the dosage cycle placement has been set to deliver the mixture application amount in the latter portion 545–550 of the run time 530–550.

The automated chemical application system 300 can account for the variability in the delivery of water by a sprinkler control system. For example, a sprinkler control system may include logic that calculates moisture in the soil and therefore may prolong or skip applications of water if sufficient moisture is present in the soil. For example, a dosage factor can be calculated according to Equation 2 below.

$$\text{dosage factor} = \frac{\text{moisture lvl factor} + \text{adjustment moisture modules}}{65} \quad [2]$$

The moisture level factor can be preset to levels such as arid, normal, and wet, or can be periodically updated using, for example, a moisture gauge. The adjustment moisture module is set based on the type of soil. In a preferred embodiment, the adjustment moisture module is a graduated scale from 1–50, with clay being "1" and sand being "50." The value "65" in the denominator of Equation 2 insures that no chemical remains in the line. For example, the system gets a short rinse if the moisture level factor and adjustment moisture modules are at a maximum level.

Once the dosage factor has been calculated, dosage cycle placement can be calculated using Equation 3 below.

$$\text{dosage cyc. place.} = (\text{dosage cyc. duration} - \text{run time}) \times \text{dosage factor} \quad [3]$$

The dosage cycle placement of the dosage cycle within the run time may be important for such reasons such as, for example, environmental conditions (e.g., arid, normal, wet), soil conditions (e.g., clay, sand), and chemical type. For example, in sandy soils it may be advisable to set the dosage cycle to deliver the mixture application amount at the end of the run time so that the water does not wash the chemical out. In contrast, in other soil environments the chemical may preferably be delivered over the entire dosage cycle to disburse the chemicals fully in the soil.

Referring once again to FIG. 3, once the dosage cycle has been set, the rate control 360 sets a pump rate. The pump rate is a function of pump speed and pump time and may be controlled by the voltage provided by the rate control 360 to the pump to deliver the mixture application amount to conduit 302. In a preferred embodiment, the pump rate is fixed and only the pump time is varied. However, in alternate embodiments, either or both the pump speed and pump time can be varied. Equations 4 and 5 illustrate one method for calculating pump rate and run time for the example embodiment provided.

$$\text{pump rate} = \text{tube size} \times \text{density} \times RPM \quad [4]$$

$$\text{run time} = \frac{\text{desired app. amt.}}{\text{pump rate}} \quad [5]$$

In this manner, the application module 307 controls the mixture application amount delivered to the dispensing module 306. The dispensing module 306 controls the manner in which the mixture application amount is dispensed to the conduit 302 to mix with the output of the sprinkler control system 395 provided via conduit 397. The conduits 302 and 397 are coupled to the valves 394, and the valves 394 deliver the water with associated chemical to the target 313.

Figure 6:
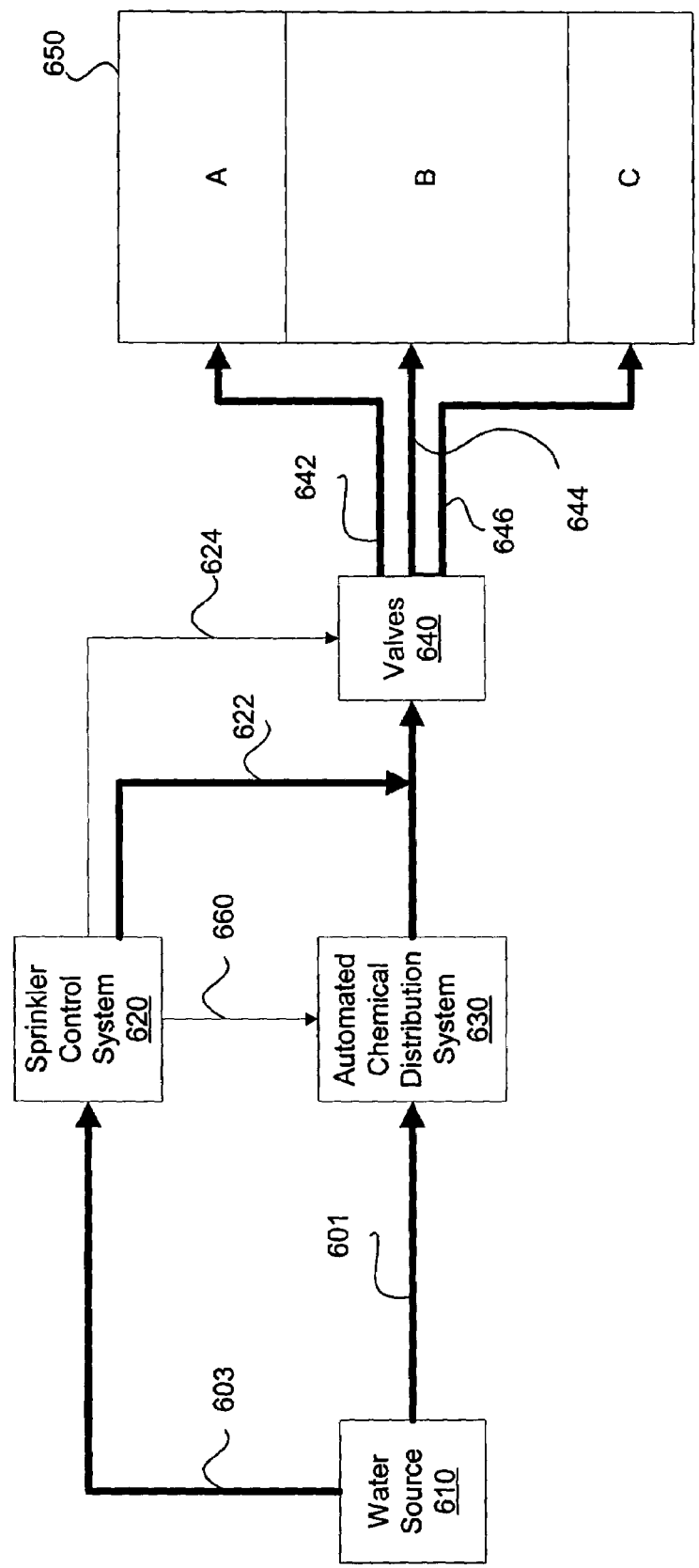
FIG. 6 shows an exemplary automated chemical application system utilized in conjunction with a sprinkler control system in accordance with an embodiment of the present invention.

In another exemplary embodiment in accordance with the present invention, a target 650 comprising a plurality of zones is shown in FIG. 6. In this example embodiment, the target 650 comprises three zones A, B, and C. It should be understood that more or fewer zones may also be used and that the zones may be of varying size. Similarly to FIG. 1, a water source 610 is coupled to an automated chemical application system 630 and a sprinkler control system 620 via conduits 601 and 603. The sprinkler control system 620 includes conduits 642, 644, and 646 positioned to deliver water from the sprinkler control system 620 to the zones A, B, and C, respectively.

The automated chemical application system 630 further includes link 660, to allow the system 130 to monitor the duration during which each of the zones A–C is activated and therefore receiving water. This monitoring may be accomplished by such methods as monitoring the voltage applied to each zone to determine when the voltage changes and the zone has been activated. When the sprinkler control system 620 begins pumping water to a zone, the zone is herein termed an active zone. In this manner, the automated chemical application system 630 calculates run times for each of the zones A–C as they are activated and can further deliver the appropriate mixture application amount via a conduit 632 and to the appropriate zone at the appropriate time.

Other methods for monitoring the run times for each of the plurality of zones may also be used. For example, some sprinkler control systems may include a central processor that controls each of the zones, and it therefore may be possible to connect to this central processor and thereby monitor the time during which each of the plurality of zones is active.

Figure 7:
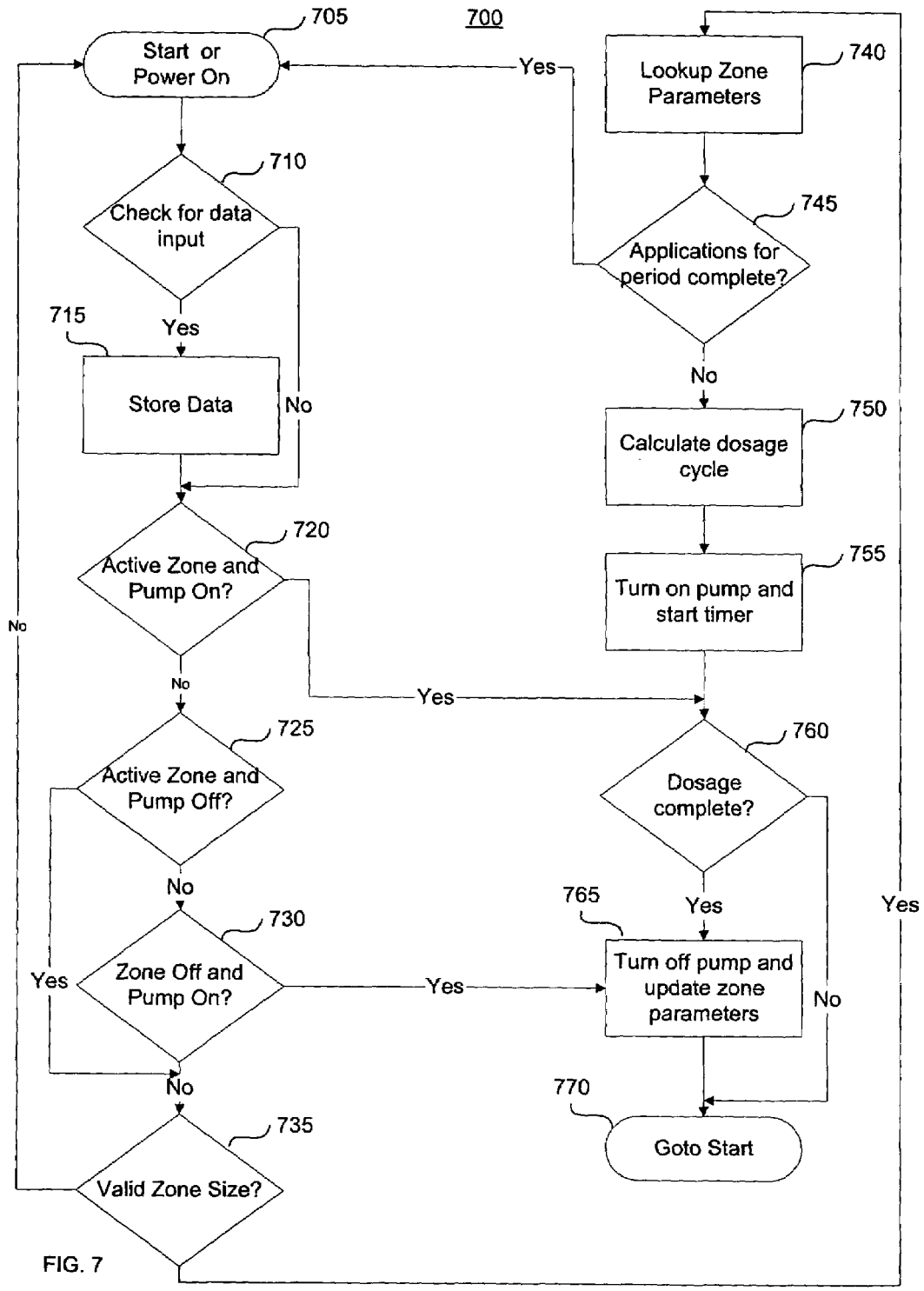
FIG. 7 shows the logical operations that may be performed by an exemplary automated chemical application system in accordance with an embodiment of the present invention.

An exemplary method 700 for implementation and control of an automated chemical application system in accordance with the present invention is illustrated in FIG. 7. The method 700 is described as a series of modules and may be implemented using a combination of hardware and software components. Generally, modules may include routines, programs, objects, components, data structures, etc. that perform particular tasks or implement particular abstract data types. Typically the functionality of the modules may be combined or distributed as desired in various embodiments.

In module 705, the automated chemical application system is powered on or the method 700 begins again. Once power up is complete, a check for user input is done in module 710. In the example embodiment, the system may initially pause up to 10 seconds waiting for user input. If user input is detected, module 715 stores the input in such memory. The system may also pause for up to 30 seconds to wait for additional user input. Other durations for the specified pauses may also be used. Once the input has been stored, control is moved to module 720. Likewise, if no input is detected within the initial pausing period, control is moved from module 710 to module 720.

In module 720, the system determines whether one of the plurality of zones is active (i.e. currently receiving water from the sprinkler control system) and whether the system is currently dispensing a mixture application amount to the zone. If both a zone is active and the system is currently dispensing a mixture application amount (i.e. the sprinkler control system is delivering water and the automated chemical application system pump is delivering a mixture application amount to the target zone), then control is passed to module 760, described further below. Otherwise, control is passed to module 725.

In module 725, the system determines whether one of the plurality of zones is active and whether the system is not currently dispensing a mixture application amount to the zone. If both of these are true (i.e. the sprinkler control system is delivering water but the automated chemical application system not delivering any mixture application amount to the zone), then control is passed to module 735, described further below. Otherwise, control is passed to module 730.

In module 730, the automated chemical application system determines whether all of the pluralities of zones are inactive and whether the automated chemical application system is currently dispensing a mixture application amount to one of the zones. If all zones are inactive and the automated chemical application system is currently dispensing a mixture application (i.e. the sprinkler control system is currently not delivering water but the automated chemical application system is delivering a mixture application amount), then control is passed to module 765, described further below. Otherwise, control is passed to module 735.

In module 735, the automated chemical application system checks to verify whether the automated chemical application system has a valid zone size for the active zone. If a valid zone size is not available for the active zone, control is passed back to module 705, and the automated chemical application system begins the method again. If, however, a valid zone size is present, control is passed to module 740. In module 740, the automated chemical application system looks up the zone parameters associated with the active zone, such as those parameters provided in Table 1 above. In module 745, the automated chemical application system calculates the mixture application amount to be applied, if any. Finally, in module 750 the automated chemical application system calculates the dosage cycle.

Control is then passed to module 755, wherein the automated chemical application system pump is activated to start to dispense the mixture application amount into the values and through to the active zone. In addition, the time/date control 375 may be activated in module 755 to begin timing a dosage cycle.

Next, in module 760 the automated chemical application system checks to determine if the dosage cycle has been completed. If the dosage cycle has not been completed, control is passed to module 770, described below. If the dosage cycle has been completed, control is passed to module 765. In module 765, the automated chemical application system pump is turned off, and the zone parameters are updated in memory. This update process is important, because the run times for each of the plurality of zones may vary as the sprinkler control system modifies the run times, therefore, it may be necessary to continually update the zone parameters with a new run time for a given zone. In this manner, the dosage cycle for a zone may be modified as the run time varies to assure complete delivery of the mixture application amount within a given run time.

Finally, in module 770 control is passed back to module 705, and the method 700 is started again.

There are several distinct advantages to the present invention as illustrated by the exemplary embodiments contained herein. First, the automated mixing and distribution processes require little or no manual intervention, thereby decreasing the amount of time and physical effort necessary to maintain a lawn. Further, the automated mixing process provides greater safety in that a user is not exposed or required to handle and manually distribute chemicals that may be harmful to the user. In addition, through customization of the parameters utilized through the use of add-on components, the automated chemical application system may tailor the distribution of chemicals to maximize benefits to the lawn.

Figure 8:
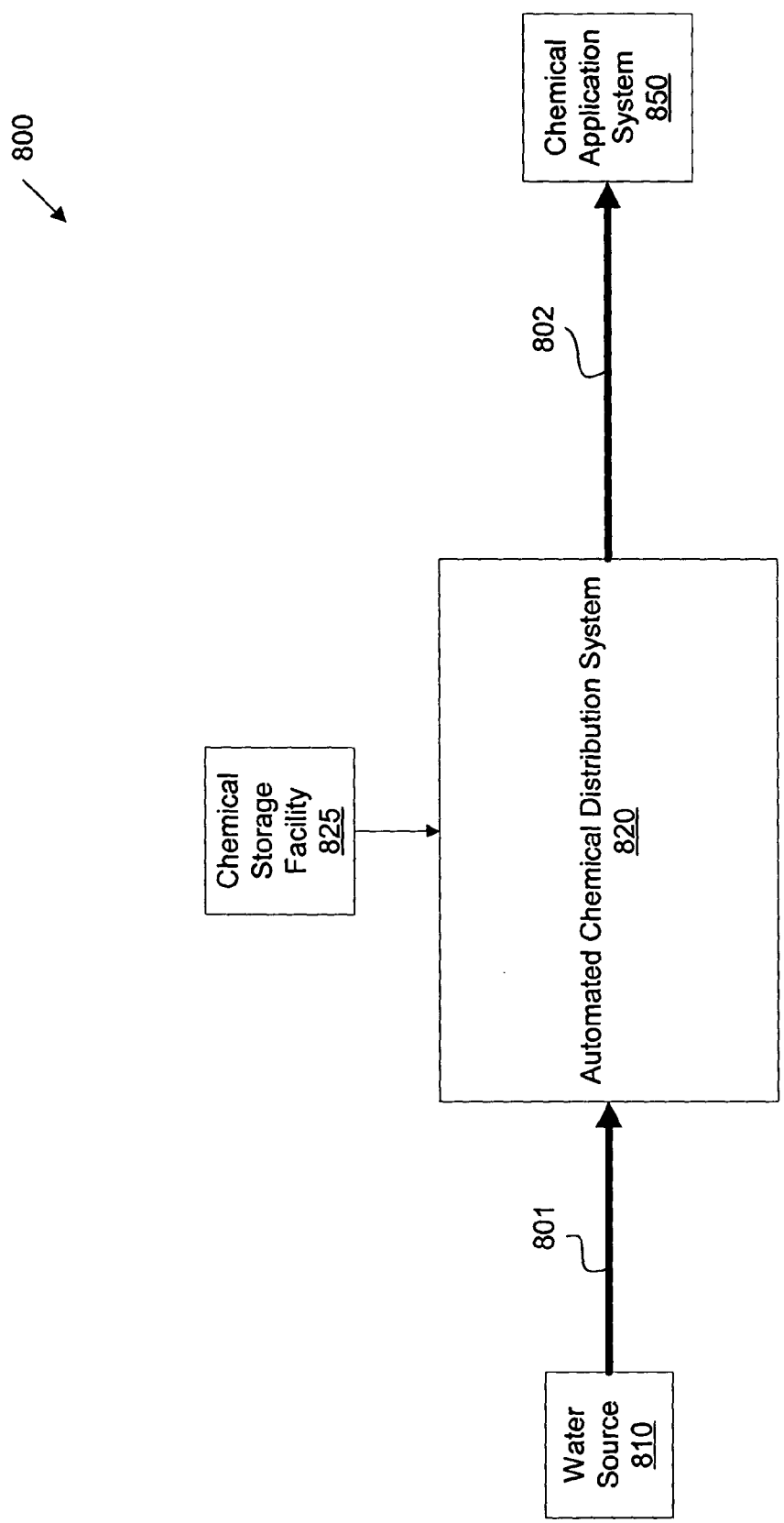
FIG. 8 illustrates an exemplary automated chemical application system in accordance with another embodiment of the present invention.

Although the invention has been described as used in conjunction with a sprinkler control system, other embodiments are also possible. In another exemplary embodiment according to the invention, an automated chemical application system 800 is illustrated in FIG. 8 along with a chemical storage facility 825, a water source 810, and a chemical application system 850. In this embodiment, the water source 810 is coupled to the automated chemical application system 800 via a conduit 801, and the automated chemical application system 800 may be coupled to the chemical application system 850 via a conduit 802. The water source 810 can be provided as part of the system 800, or can alternatively be provided from a separate water source.

The automated chemical application system 800 functions in a manner similar to the automated chemical application system 130 illustrated in FIG. 1, except that the automated chemical application system 800 is not designed to be utilized in conjunction with a sprinkler control system, but is instead designed to measure, mix and dispense a mixture application amount along with a desired quantity of water to the chemical application system 850 directly via conduit 802. The chemical application system 850 may consist of a spraying nozzle or other such handheld device typically used to apply a chemical mixture to a target such as a lawn.

The chemical storage facility 825 may function similarly to mixing module 210 of system 130 described above. However, the chemical storage facility may also function to contain a plurality of chemicals Q, R, S, and T, rather than a single chemical, as shown in another exemplary embodiment in FIG. 9. In this example embodiment, a storage facility 925 comprises separate containers 920, 921, 922, and 923 that each house a separate chemical Q, R, S, and T. The chemical themselves, or a sump mixture containing a certain concentration of the chemicals, is delivered via conduits 905, 915, 925, and 935 to an automated chemical application system 920 for delivery. The different chemicals may be combined to create a composite mixture application amount, or the different chemicals may be applied at different times as needed.

Figure 9:
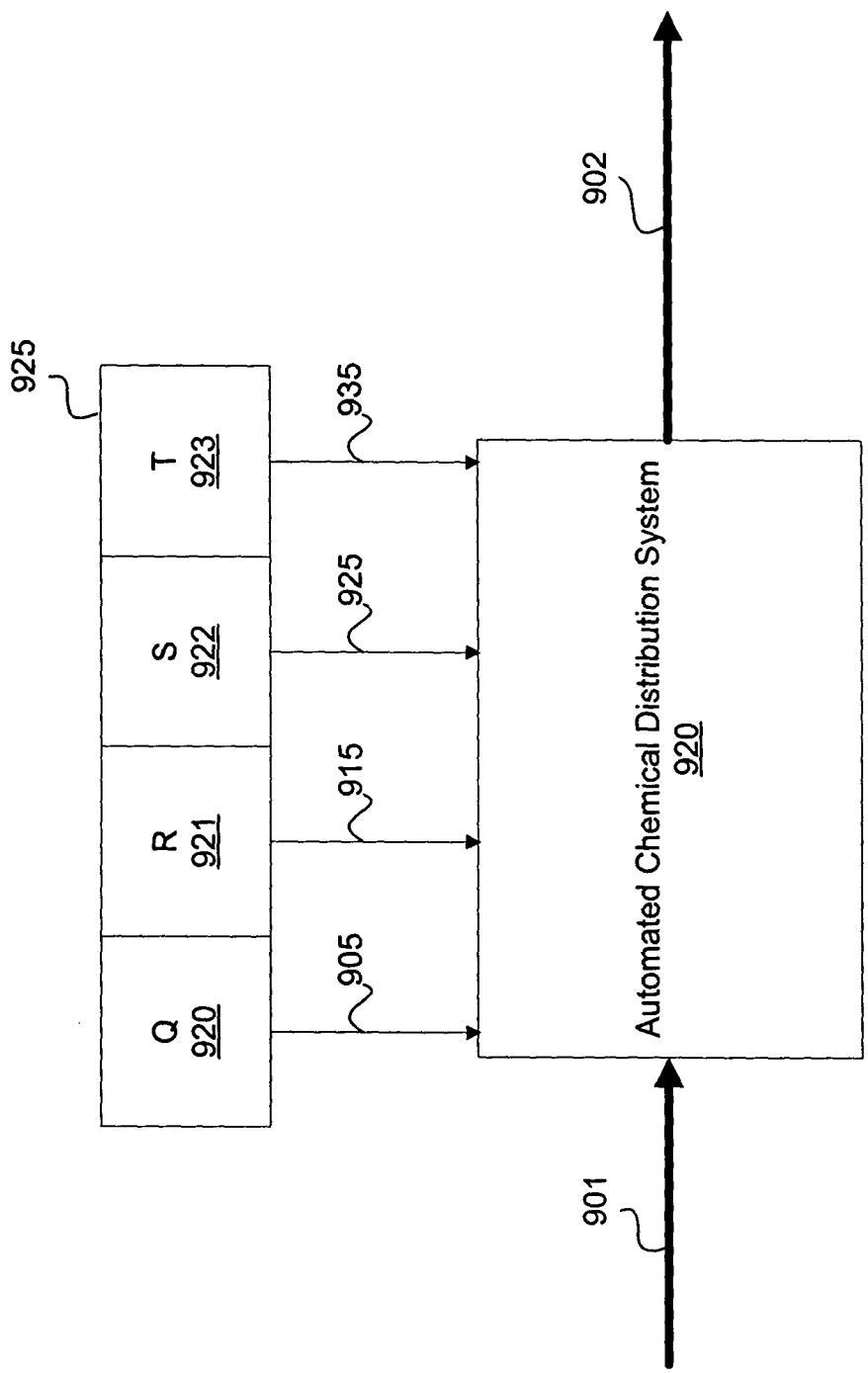
FIG. 9 illustrates an exemplary automated chemical application system in accordance with another embodiment of the present invention.

The dosage cycle for the embodiments illustrated in FIGS. 8 and 9 may be automatically calculated by the automated chemical application system, or the user may monitor the dosage cycle manually.

In this manner, the embodiments illustrated in FIGS. 8 and 9 may function to allow efficient application of multiple chemicals tailored to a specific target and to replace bulky liquid storage tanks that must be transported to a target. Instead, one or more concentrated chemicals, possibly in solid or powdered form, may be transported via a chemical storage facility, and a precise mixture application may be created by the automated chemical application system by combining the one or more chemicals with a water source.

One example application in which an automated chemical application system such as those shown in FIGS. 8 and 9 may be utilized is in commercial lawn care trucks that currently transport large containers of pre-mixed chemicals and water to individual homes to treat an individual's lawn. The automated chemical application system may be implemented as part of a smaller commercial truck that may be driven to the individual's home. Water from a separate tank on the truck or from a water source near or in the individual's home may be used to mix the chemicals and apply the chemicals to the lawn via a sprayer controlled by an operator.

Figure 10:
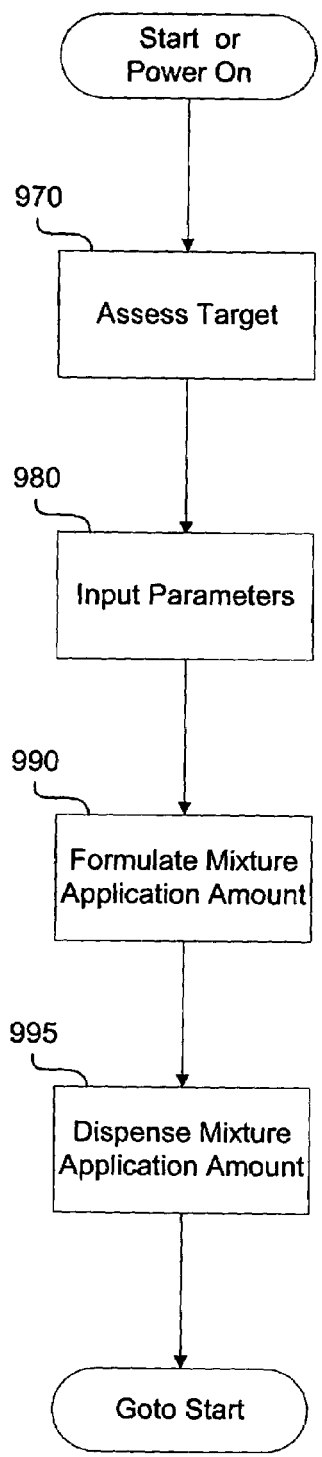
FIG. 10 shows the logical operations that may be performed by an exemplary automated chemical application system in accordance with an embodiment of the present invention.

For example, a lawn treatment truck including one of the automated chemical application systems illustrated in either FIGS. 8 or 9 can be used in conjunction with the example method illustrated in FIG. 10 to tailor application of chemicals to the individual's lawn. In module 970, the target, in this case a lawn, is assessed by the technician. The assessment may include, for example, multiple reading such as soil condition, moisture level, etc. In addition, the target can be divided into multiple zones if the target varies.

Next, in module 980, the results of the assessment are entered into the automated chemical application system. For example, the technician may enter parameters similar to those provided above in Table 1, such as size, soil condition, pH level, number and types of weeds present, insects present, time in season, etc. After the parameters have been entered, the system can formulate the mixture application amount similar to the way described with respect to FIGS. 8 and 9, utilizing desired fertilizers, herbicides, pesticides, etc. The system can further utilize historical data previously collected about the target (e.g., in previous years, or regarding surrounding targets) in determining the mixture application amount. Since the mixture application amount is formulated based on the particular parameters provided for the target, the chemicals provided in the mixture application amount can be tailored to suit the requirements of the target.

Finally, in module 995, the mixture application amount is dispensed. For example, the technician can dispense the mixture application amount by spraying the mixture onto the target.

Another example application includes a golf course or other such large area involving a variety of lawn conditions. In the case of the golf course, a small vehicle may be provided that transports an automated chemical application system throughout the golf course, and water sources provided throughout the golf course may be used. Further, an add-on component such as a global positioning device may be utilized as part of automated chemical application system. The global positioning device could provide the exact location of the automated chemical application system within the golf course during application of the mixture application amount, and the system could automatically tailor the chemicals provided to different zones within the golf course based on the location of the automated chemical application system 800.

The two examples illustrating the possible applications of a system are not exhaustive. Other applications may include, for example, the application of chlorine and other chemicals to swimming pools, whirlpools, hot tubs, etc. In this application, the automated chemical application system may include an add-on component that functions to continually monitor the chemical content of the water in a swimming pool. If the concentration of any of the chemicals is depleted, the automated chemical application system may automatically mix or dissolve the desired chemical and deliver the diluted chemical to the swimming pool, thereby maintaining the proper chemistry for the swimming pool. Other applications may include disinfectants (e.g. food processing lines) and roads (e.g. application of deicing chemicals).

Figure 11:
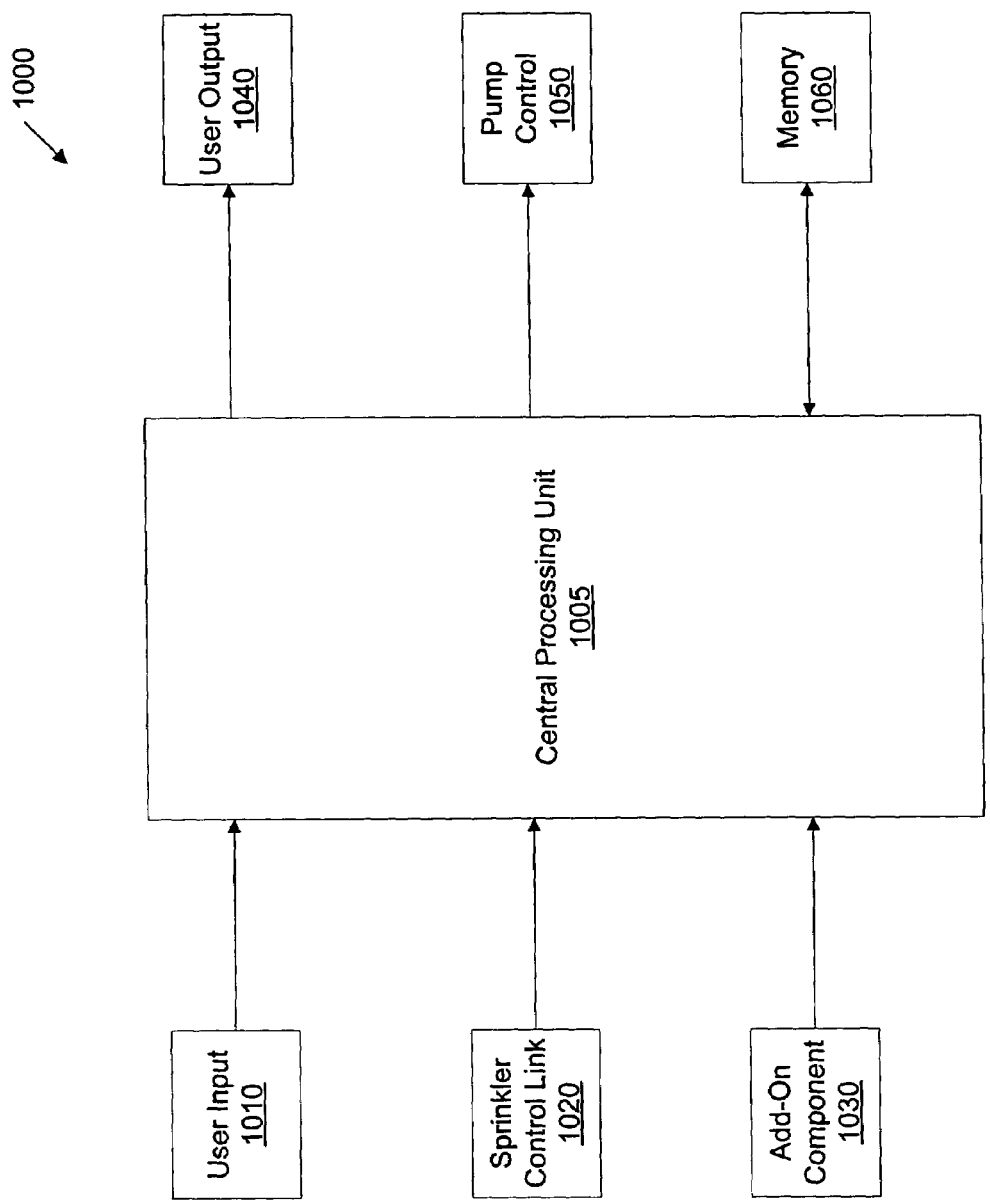
FIG. 11 shows an exemplary schematic of an automated chemical application system in accordance with an embodiment of the present invention.

In FIG. 11, an exemplary schematic is provided illustrating an automated chemical application system 1000 in accordance with the present invention. A central processing unit 1005 processing all inputs to the automated chemical application system 1000 and further controls all outputs. Coupled as inputs to the central processing unit 1005 are a user input 1010, a sprinkler control input 1020, and an add-on component input 1030. Coupled as outputs are a user output 1040 and a pump control 1050. Also included is input and output from a memory 1060.

The user input 1010 allows a user to communicate with the central processing unit 1005. The user input 1010 may consist of a variety of communication devices, including but not limited to, a computer, a network interface, a keypad, a switch, a press button, etc. The user output 1040 may consist of a variety of output devices, including but not limited to, a computer, a network interface, a display, an LED, etc.

The sprinkler control link 1020 allows the central processing unit 1005 to monitor the activity of a sprinkler control system, to calculate, for example, a run time for a plurality of zones. The add-on component 1030 provides data from one or more add-on components to the central processing unit 1005.

The central processing unit 1005 controls a variety of pumps via pump control 1050. For example, the central processing unit 1005 can control a pump used to create the sump mixture, and, if a separate pump is utilized, control a pump used to deliver a mixture application amount to a target.

In FIG. 12, an exemplary chemical source control similar to that disclosed in U.S. Pat. No. 4,690,305 to Copeland is depicted. The chemical source control includes a housing 20 with a generally cylindrical upper storage portion 21 having a cylindrical inner wall 22. The wall 22 defines an internal cavity 23. The upper terminous of the storage portion 21 defines an access port 24 into cavity 23 of storage portion 21. Inner wall 22 of housing 20 converges in the downward direction, defining a lower funnel-shaped collector portion 25 of housing 20. Inner wall 22 of housing 20 is configured to form an annular flange at 26 circumferentially extending around inner wall 22 of housing 20 at the juncture of upper storage portion 21 and lower collector portion 25. The lower terminous of collector portion 25 defines an outlet port 27 from internal cavity 23 for passage therethrough of solution collected by collector portion 25. Outlet port 27 has a hose clamp extension 28 having a plurality of annular ribs configured for engaging the inner walls of a connecting hose or conduit 29. The outlet port 27 may be directly connected with conduit 134 of the chemical distribution system by conduit 29 and feed thereto by gravity as it is created or feed thereto by a chemical solution pump 30 placed in conduit 29.

A door 34 is sized to extend entirely across and to sealingly close access port 24. Door 34 is pivotally mounted to the brace member 33 at 35 for pivotal motion between a closed position and an open position. The lower collector portion 25 of housing 20 has an outwardly projecting coupling portion 36 extending from collector portion 25 adjacent outlet port 27 of collector portion 25. A tube fitting insert 37 is secured within coupling projection 36 and projects through inner wall 22 of collector portion 25 of housing 20. A spray-forming nozzle 38 is threaded into the end of tube insert 37 and is axially aligned within inner cavity 23 of housing 20 in a direction so as to direct an upwardly projected spray pattern therefrom. Tube fitting insert 37 is provided with an O-ring seal 39. A horizontal support screen 40 is mounted in resting engagement upon annular flanged portion 26 of housing 20. Support screen 40 has about 1 inch square openings in order to support a solid block of chemical 80 without significantly interfering with the impingement of water sprayed from nozzle 38 onto the lower surface 81 of the chemical block 80 (i.e. the surface in contact with support screen 40) A ¼ to ½0 inch (0.63 to 0.13 cm) lower screen 41 is placed in collection port 25 of housing 20 between spray nozzle 38 and outlet port 27 to catch any undissolved chunks of chemical 80 small enough to pass through support screen 40. This prevents small chunks of chemical 80 collecting in outlet port 27 or conduit 29 and blocking the flow of concentrated chemical solution out of dispenser 20.

A water supply inlet pipe 42 is connected to tube insert 37 and is in communication therewith for providing a source of water flow to spray-forming nozzle 38. Water supply line 42 passes through one of the mounting plate members 32 and receives structural support therefrom. The pump 30 is operative in response to a control signal from a controller such as central processing unit 1005. A float 31 is positioned within collector portion 25 of housing 20 and operatively connected by float extension bar 61 to float switch 60. Float switch 60 is operatively connected to spray control means 43 for controlling the flow of water to the nozzle 38, so as to maintain a constant level of chemical solution in collector portion 25. When the level of chemical solution in collector portion 25 of housing 20 is below the desired constant level due to operation of the chemical pump 30, the float switch 60 is electrically closed and spray control means 43 opened to the flow of water therethrough and additional chemical solution is formed until float 31 returns to its desired level. Float switch 60 is in communication with float extension bar 61 for sensing the operative position of float extension bar 61 with respect to the position of float 31.

Operation of the dispensing apparatus illustrated in FIG. 12 is as follows. A block of solid chemical 80 is loaded into upper storage portion 21 of housing 20 through access port 24. When provided with fluid flow therethrough, spray-forming nozzle 38 will direct a spray pattern at the bottom surface of support screen 40, wetting that chemical 80 carried immediately thereabove 81, which dissolves and passes in solution through support screen 40 to collector portion 25 of housing 20. Thus, concentrated chemical solution is produced in this arrangement of the apparatus. The concentrated solution passes through outlet port 27 of housing member 20 and is directed by conduit 29, through conduit 134, wherein the dissolved chemical can be mixed with additional liquid and delivered to a target.

The example systems described herein can, but need not, be implemented as part of a computer system. For example, in a preferred embodiment, the systems initially are programmed using a computer system. In alternative embodiments, the systems may be controlled using computer systems.

Figure 13:
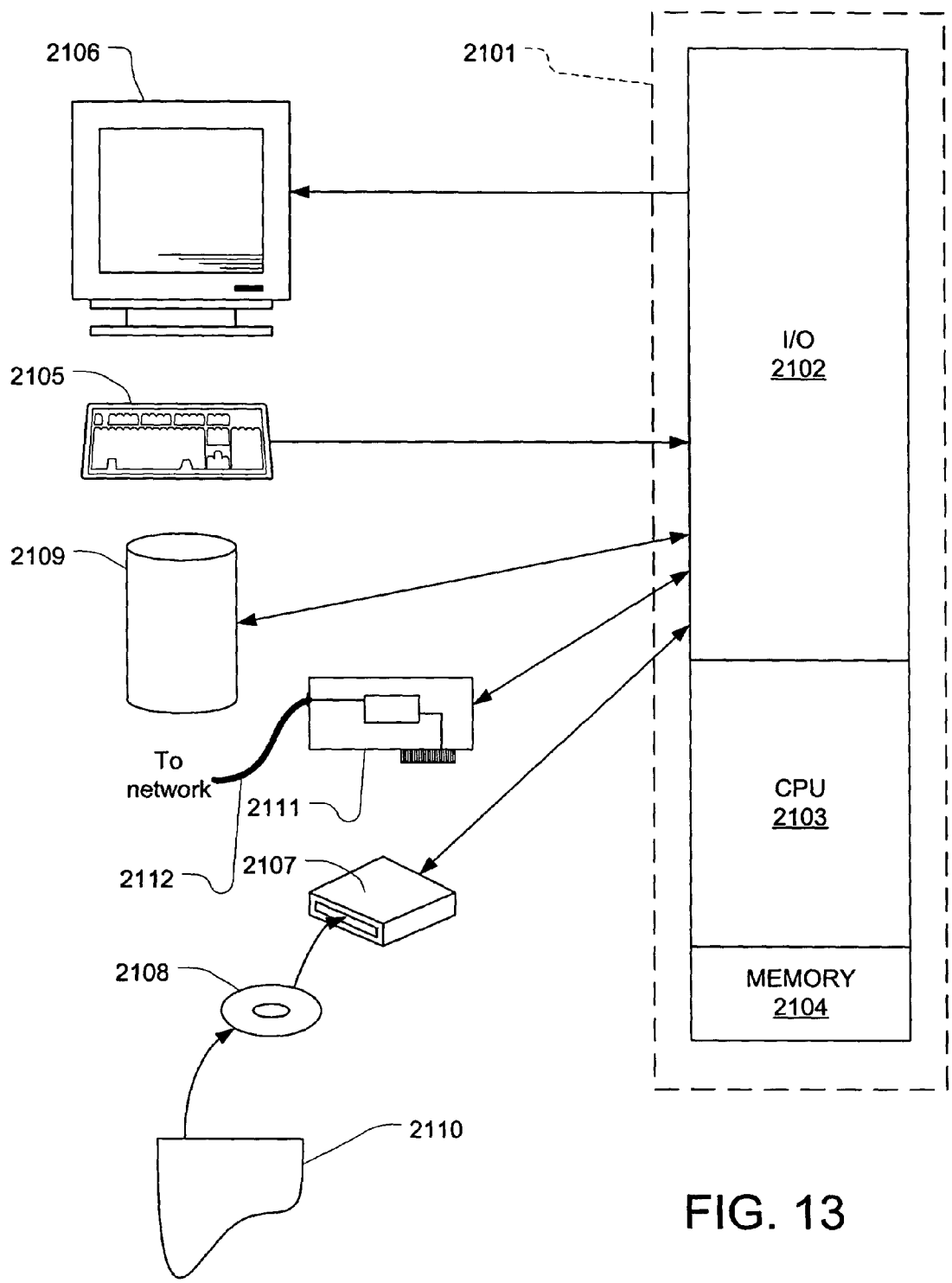
FIG. 13 depicts an exemplary computer system that may be used in conjunction with or as a component of an exemplary automated chemical application system in accordance with an embodiment of the present invention.

For example, FIG. 13 depicts a general purpose computer capable of initially programming and/or implementing the systems disclosed herein. In such a system, data and program files may be input to the computer, which reads the files and executes the programs therein. Some of the elements of a general purpose computer are shown in FIG. 13 wherein a processor 2101 is shown having an input/output (I/O) section 2102, a Central Processing Unit (CPU) 2103, and a memory section 2104. The present invention is optionally implemented in software devices loaded in memory 2104 and/or stored on a configured CD-ROM 2108 or storage unit 2109 thereby transforming the computer system in FIG. 13 to a special purpose machine for implementing the present invention.

The I/O section 2102 is connected to keyboard 2105, display unit 2106, disk storage unit 2109, and disk drive unit 2107. Generally, in contemporary systems, the disk drive unit 2107 is a CD-ROM driver unit capable of reading the CD-ROM medium 2108, which typically contains programs 2110 and data. Computer program products containing mechanisms to effectuate the systems and methods in accordance with the present invention may reside in the memory section 2104, on a disk storage unit 2109, or on the CD-ROM medium 2108 of such a system. Alternatively, disk drive unit 2107 may be replaced or supplemented by a floppy drive unit, a tape drive unit, or other storage medium drive unit. The network adapter 2111 is capable of connecting the computer system to a network via the network link 2112. Examples of such systems include SPARC systems offered by Sun Microsystems, Inc., personal computers offered by IBM Corporation and by other manufacturers of IBM-compatible personal computers, and other systems running a UNIX-based or other operating system. In accordance with the present invention, software instructions such as those directed toward communicating between a client and a server, providing a user interface, and accessing data and services may be executed by CPU 2103, and data such as polling schedules, point and meter data, and rates may be stored on disk storage unit 2109, disk drive unit 2107 or other storage medium units coupled to the system.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method for automating application of a chemical to a target through a liquid dispenser having a dosage cycle during which liquid is dispensed therefrom, the chemical being provided by a solid chemical source, the liquid dispenser being coupled to a liquid source providing at least a portion of the liquid, the target having a target area, the method comprising:
   determining an amount of the chemical to be applied to the target, based on the target area;
   receiving a mixing liquid from the liquid source;
   applying the mixing liquid to the solid chemical source to create a sump mixture containing the mixing liquid and the amount of the chemical and calibrating the sump mixture to adjust a concentration of the sump mixture, wherein the calibrating step comprises automatically performing the calibration by measuring a refractive index of the sump mixture; and
   distributing, during at least a portion of at least one run time of a sprinkler control system, the sump mixture flowing through the liquid dispenser to an output of the sprinkler control system, wherein the sump mixture is mixed with the output of the sprinkler control system and is delivered via the sprinkler control system to the target.

2. A method for automating application of a chemical to a target through a liquid dispenser having a dosage cycle during which liquid is dispensed therefrom, the chemical being provided by a solid chemical source, the liquid dispenser being coupled to a liquid source providing at least a portion of the liquid, the target having a target area, the method comprising:

determining an amount of the chemical to be applied to the target, based on the target area;

receiving a mixing liquid from the liquid source;

applying the mixing liquid to the solid chemical source to create a sump mixture containing the mixing liquid and the amount of the chemical and calibrating the sump mixture to adjust a concentration of the sump mixture, wherein the calibrating step comprises performing the calibration using a calorimetric system; and distributing, during at least a portion of at least one run time of a sprinkler control system, the sump mixture flowing through the liquid dispenser to an output of the sprinkler control system, wherein the sump mixture is mixed with the output of the sprinkler control system and is delivered via the sprinkler control system to the target.

3. A method for automating application of a chemical to a target through a liquid dispenser having a dosage cycle during which liquid is dispensed therefrom, the chemical being provided by a solid chemical source, the liquid dispenser being coupled to a liquid source providing at least a portion of the liquid, the target having a target area, the method comprising:

determining an amount of the chemical to be applied to the target, based on the target area;

receiving a mixing liquid from the liquid source;

applying the mixing liquid to the solid chemical source to create a sump mixture containing the mixing liquid and the amount of the chemical and calibrating the sump mixture to adjust a concentration of the sump mixture, wherein the calibrating step comprises performing the calibration using a conductivity system; and distributing, during at least a portion of at least one run time of a sprinkler control system, the sump mixture flowing through the liquid dispenser to an output of the sprinkler control system, wherein the sump mixture is mixed with the output of the sprinkler control system and is delivered via the sprinkler control system to the target.

4. A method for automating application of a chemical to a target through a liquid dispenser having a dosage cycle during which liquid is dispensed therefrom, the chemical being provided by a solid chemical source, the liquid dispenser being coupled to a liquid source providing at least a portion of the liquid, the target having a target area, the method comprising:

determining an amount of the chemical to be applied to the target, based on the target area, and dividing the target into a plurality of zones;

receiving a mixing liquid from the liquid source;

applying the mixing liquid to the solid chemical source to create a sump mixture containing the mixing liquid and the amount of the chemical; and distributing, during at least a portion of at least one run time of a sprinkler control system, the sump mixture flowing through the liquid dispenser to an output of the sprinkler control system, wherein the sump mixture is mixed with the output of the sprinkler control system and is delivered via the sprinkler control system to the target, wherein the distributing step further comprises:

measuring the run time for each of the plurality of zones;

defining the dosage cycle based on the run time; and dispensing the sump mixture within the dosage cycle.

5. The method of claim 4, wherein the distributing step further comprises positioning the dosage cycle as a specific portion of the run time.

6. The method of claim 4, wherein the determining step further comprises tailoring the sump mixture based on the specific needs of each of the plurality of zones.

7. The method of claim 4, further comprising adjusting the sump mixture based on input from at least one add-on component.

8. The method of claim 4, wherein the determining step further comprises comparing a total previous application amount to a desired application amount to formulate the sump mixture.

9. The method of claim 4, wherein the determining step further comprises: selecting from a plurality of chemicals; and accessing data relevant to each of the plurality of chemicals.

10. The method of claim 9, wherein the selecting step further comprises mixing two or more of the plurality of chemicals.

11. An automatic chemical application system for automating application of a chemical to a target through a liquid dispenser having a dosage cycle during which liquid is dispensed therefrom, the chemical being provided by a solid chemical source, the liquid dispenser being coupled to a liquid source providing at least a portion of the liquid, the target having a target area, the system comprising:

a computing module that determines an amount of the chemical to be applied to the target, based on the target area;

a mixing module coupled to the computing module that receives a mixing liquid from the liquid source and applies the mixing liquid to the solid chemical source to create a sump mixture containing the mixing liquid and the amount of the chemical; and a dispensing module coupled to the mixing module and a sprinkler control system, wherein the dispensing module distributes, during at least a portion of at least one run time of the sprinkler control system, the sump mixture through the liquid dispenser to an output of the sprinkler control system, wherein the sump mixture is mixed with the output of the sprinkler control system and is delivered via the sprinkler control system to the target.

12. The system of claim 11, further comprising an application module coupled to the mixing module, wherein the application module calculates a total previous application amount, compares the total previous application amount and a desired application amount, and automatically adjusts the mixture application amount based on the comparison.

13. The system of claim 12, wherein the application module maintains the total previous application amount for a given duration.

14. The system of claim 11, wherein the target is divided into a plurality of zones.

15. The system of claim 14, further comprising a zone control module coupled to the dispensing module, wherein the zone control module maintains a plurality of zone parameters associated with each of the plurality of zones.

16. The system of claim 14, further comprising a cycle control module coupled to the dispensing module, wherein the cycle control module calculates the dosage cycle as at least a portion of the run time of the plurality of zones.

17. The system of claim 16, wherein the dosage cycle is positioned at an initiation of the run time for each of the plurality of zones.

18. The system of claim 16, wherein the dosage cycle is positioned at an end of the run time for each of the plurality of zones.

19. The system of claim 11, further comprising an add-on interface control coupled to the dispensing module, wherein the add-on interface control is operable to communicate with at least one add-on component.

20. The system of claim 19, wherein the sump mixture is adjusted based on an input from the add-on component.

21. An automatic chemical application system for automating application of an agricultural chemical to an agricultural target through a liquid dispenser having a dosage cycle during which liquid is dispensed therefrom, the agricultural chemical being provided by a solid chemical source, the liquid dispenser being coupled to a water source providing at least a portion of the liquid, the agricultural target having a target area, the system comprising:

a computing module that determines an amount of the agricultural chemical to be applied to the agricultural target, based on the target area;

a mixing module coupled to the computing module that receives water from the water source and applies the water to the solid chemical source to create a sump mixture containing water and the amount of the agricultural chemical; and a dispensing module coupled to the mixing module and a sprinkler control system, wherein the dispensing module distributes, during at least a portion of at least one run time of the sprinkler control system, the sump mixture through the liquid dispenser to an output of the sprinkler control system, wherein the sump mixture is mixed with the output of the sprinkler control system and is delivered via the sprinkler control system to the agricultural target.

\* \* \* \* \*

UNITED STATES PATENT AND TRADEMARK OFFICE
CERTIFICATE OF CORRECTION

PATENT NO. : 6,994,271 B2
APPLICATION NO. : 10/667292
DATED : February 7, 2006
INVENTOR(S) : Jim Tarara et al.

It is certified that error appears in the above-identified patent and that said Letters Patent is hereby corrected as shown below:

Title page item (75), line 1, under Inventors, "James Tarara, Eagan, MN" should be --James Tarara, Woodbury, MN--

Col. 5, Line 27, after "as well" insert the following --as a screen, series of lights, speaker or other sych method of output. In this manner, the user interface 372 allows for input from the user and provides output to the user.
In the illustrated embodiment, the time/date control 375 provides current time and date and measures duration of time. The data store 380 may comprise any type of conventional memory such as, for example, volatile and/or non-volatile memory, to store and allow access to a plurality of parameters associated with the operation of the automated chemical application system 300. A Table 1 below provides exemplary parameters that may be stored in data store 380. Many of these parameters are further defined in the description below. The parameters provided in Table 1 are by way of example only, and other parameters are also possible. Furthermore, not all of the parameters are required to implement an embodiment of the present invention.--

Col. 5, Line 65, after "distribution may be manually" insert the following --activated and deactivated, and certain functional parameters may be manually--

Col. 6, Line 3, after "with a plurality of" insert the following --add-on components that can be used with the automated chemical application system 300. For example, one such add-on component includes a moisture sensor positioned within the target 313 to provide feedback to the automated chemical application system 300 as to the water content of the target 313. In this manner, the mixture application amount can be tailored to maximize the benefits to the target 313.--

Col. 6 Lines 3 delete "as a screen,"

UNITED STATES PATENT AND TRADEMARK OFFICE
CERTIFICATE OF CORRECTION

PATENT NO. : 6,994,271 B2
APPLICATION NO. : 10/667292
DATED : February 7, 2006
INVENTOR(S) : Jim Tarara et al.

It is certified that error appears in the above-identified patent and that said Letters Patent is hereby corrected as shown below:

Col. 6, delete lines 4-26.

Signed and Sealed this

Fourteenth Day of November, 2006

JON W. DUDAS
*Director of the United States Patent and Trademark Office*